US005937719A

United States Patent [19]

Davis et al.

[11] Patent Number: 5,937,719

[45] Date of Patent: Aug. 17, 1999

[54] ROTARY PUNCH

[75] Inventors: Kurt E. Davis, Maryland Heights; William E. Brickey, Kirkwood, both of Mo.

[73] Assignee: Wilson Manufacturing Company, St. Louis, Mo.

[21] Appl. No.: 08/671,712

[22] Filed: Jun. 27, 1996

[51] Int. Cl.[6] .............................. B23D 25/12; B26D 1/62

[52] U.S. Cl. ........................... 83/345; 83/670; 83/698.41; 83/337; 83/305

[58] Field of Search .............................. 83/660, 663, 665, 83/333, 343, 345, 346, 337, 591, 646, 647.5, 669, 670, 673, 687, 691, 659, 698.11, 698.41, 698.51, 699.51, 305

[56] References Cited

U.S. PATENT DOCUMENTS

| | | | |
|---|---|---|---|
| 687,904 | 12/1901 | Seymour | 83/345 X |
| 1,180,102 | 4/1916 | Avery . | |
| 1,271,727 | 7/1918 | Krauth | 83/345 X |
| 1,649,635 | 11/1927 | Willard . | |
| 1,949,340 | 2/1934 | Togel | 83/591 X |
| 2,083,370 | 6/1937 | Greulich | 83/345 X |
| 2,098,165 | 11/1937 | Riggenbach | 83/346 X |
| 2,157,556 | 5/1939 | Menschner | 83/669 X |
| 2,163,487 | 6/1939 | Dorman | 83/669 X |
| 2,405,204 | 8/1946 | Goodrich | 83/343 X |
| 2,550,146 | 4/1951 | Gillich et al. | 83/591 X |
| 3,096,015 | 7/1963 | Bradbury . | |
| 3,299,761 | 1/1967 | Goldman . | |
| 3,463,042 | 8/1969 | Goldman . | |
| 3,657,954 | 4/1972 | Wilkins . | |
| 4,123,956 | 11/1978 | Harvey . | |
| 4,226,149 | 10/1980 | Feldkamper et al. | 83/345 X |
| 4,594,926 | 6/1986 | Propheter | 83/670 X |
| 4,674,372 | 6/1987 | Mobley . | |
| 4,949,449 | 8/1990 | Wilson . | |
| 4,962,683 | 10/1990 | Scheffer et al. | 83/346 X |
| 5,136,905 | 8/1992 | Stack et al. . | |
| 5,214,990 | 6/1993 | Ben-David et al. . | |
| 5,427,005 | 6/1995 | Breton | 83/346 X |

*Primary Examiner*—Rinaldi I. Rada
*Assistant Examiner*—Boyer Ashley
*Attorney, Agent, or Firm*—Senniger, Powers, Leavitt & Roedel

[57] ABSTRACT

A rotary perforation apparatus for perforating sheet material. The apparatus includes a frame, a die holder mounted on the frame for rotation about a first axis, at least one die mounted on the die holder, a punch carrier mounted on the frame for rotation about a second axis generally parallel to the first axis, and at least one punch mounted on the punch carrier. The punch is movable in a generally radial direction with respect to the second axis. The apparatus also includes a drive mechanism for rotating at least one of the die holder and the punch carrier about its respective axis to effect relative rotation between the die holder and the punch carrier. The rotation is synchronized so the punch on the punch carrier is intermittently cooperable with the die on the die holder for perforating sheet material fed between the die holder and the punch carrier. A stop assembly mounted on the frame is intermittently engageable with the punch to hold the punch against inward radial movement toward the second axis when the punch is cooperating with the die to perforate the sheet material.

14 Claims, 8 Drawing Sheets

166
190
188
168
182
164
160
114
132
110
26
118
36
36
36
24
130
140
28
34
34
34
94
22
90
92
32

ROTARY PUNCH

BACKGROUND OF THE INVENTION

This invention generally relates to apparatus for perforating sheet material, and more particularly to a rotary punch having a spherical punch mounted on a rotating punch carrier and a die mounted on a die holder which rotates in a direction opposite the punch carrier.

Rotary punches are used to make a series of holes in continuous sheet material. For instance, the holes adjacent the side margins of tractor feed computer printer paper are frequently made using rotary punches. This type of punch accurately and inexpensively makes holes in sheet material at material feed speeds up to 600 feet per minute or more.

Many prior art rotary punches have cylindrical pin punches. The leading and trailing corners of the pin punches contact the corners of the dies as each hole is made because the punches and dies rotate relative to each other. This contact causes the punches and dies to wear, eventually requiring they be replaced. The contact also causes heat which can damage some sheet materials or cause the materials to melt, thereby gumming up the punches and dies and reducing their ability to perforate the sheet material. Moreover, the heat can embrittle the punches, increasing their potential to break.

In order to alleviate these problems, some prior art rotary punches use spherical punches which do not make as much contact with the dies as pin punches. Thus, the heat generated by spherical punches is less than that generated by pin punches, so the problems associated with heat buildup are reduced. The spherical punches are biased against the dies by springs in many of the prior art rotary punches. However, spring-loaded punches require lengthy punch spacings to accommodate the large springs required to cut tough materials. These punch spacings are unacceptably large for some applications.

SUMMARY OF THE INVENTION

Among the several objects and features of the present invention may be noted the provision of a rotary perforation apparatus having increased punch life; the provision of such an apparatus which is adjustable between perforating and nonperforating positions; the provision of such an apparatus capable of perforating tough sheet materials; the provision of such an apparatus capable of perforating sheet materials comprising adhesives; the provision of such an apparatus which generates low punch temperatures; and the provision of such an apparatus having punches which are economical to manufacture and maintain.

Briefly, this invention involves an improved rotary perforation apparatus for perforating sheet material. The apparatus comprises a frame, a die holder mounted on the frame for rotation about a first axis, at least one die mounted on the die holder, a punch carrier mounted on the frame for rotation about a second axis generally parallel to the first axis, and at least one punch mounted on the punch carrier. The punch is movable in a generally radial direction with respect to the second axis. The apparatus also includes a drive mechanism for rotating at least one of the die holder and the punch carrier about its respective axis to effect relative rotation between the die holder and the punch carrier. The rotation is synchronized so the punch on the punch carrier is intermittently cooperable with the die on the die holder for perforating sheet material fed between the die holder and the punch carrier. Stop means mounted on the frame are intermittently engageable with the punch to hold the punch against inward radial movement toward the second axis when the punch is cooperating with the die to perforate the sheet material.

In a second aspect of this invention, the rotary perforation apparatus comprises a frame, first and second generally parallel shafts rotatably mounted on the frame, a die holder mounted on the first shaft for rotation with respect to the frame, at least one die mounted on the holder, and a punch carrier mounted on the second shaft for rotation with respect to the frame. The punch carrier comprises an annular rim having at least one aperture extending radially inwardly from an exterior surface of the rim to an interior surface of the rim. A punch is positioned within the punch carrier aperture for generally radial, reciprocal movement within the aperture. The apparatus also includes a drive mechanism for rotating the die holder and punch carrier in synchronized motion with respect to each other so the punch is intermittently cooperable with the die opening for perforating sheet material passing between the die holder and punch carrier. In addition, the apparatus comprises a stop positioned on the inside of the interior surface of the rim of the punch carrier for intermittently engaging the punch to hold the punch against inward radial movement toward the second shaft when the punch is cooperating with the die opening to perforate the sheet material.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
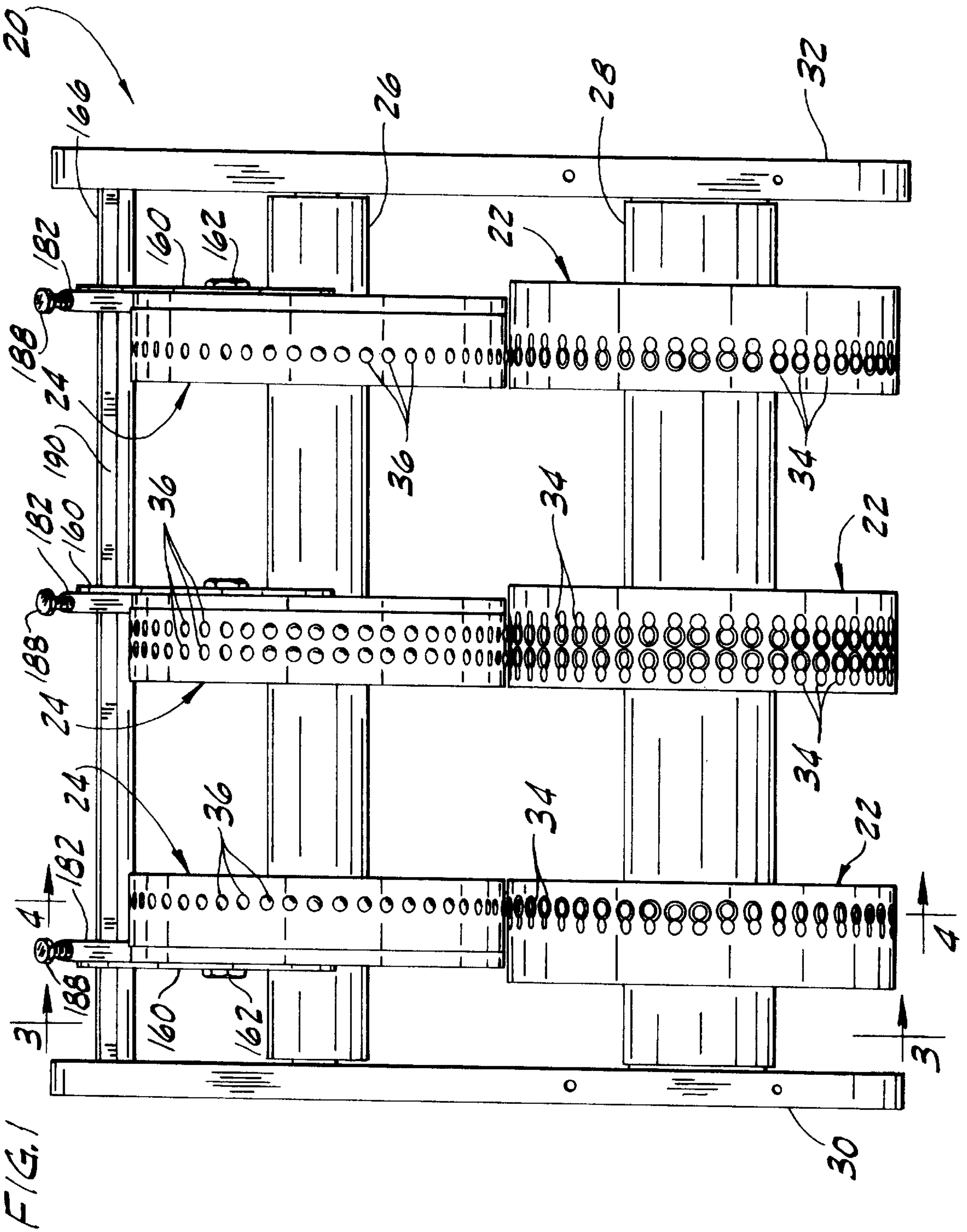
FIG. 1 is a front elevation of the rotary perforation apparatus of the present invention shown without the drive mechanism.

Referring now to the drawings and in particular to FIG. 1, apparatus of the present invention is indicated in its entirety by the reference numeral 20. The apparatus 20 includes a series of rotary die holders (each generally designated by 22) and a series of punch carriers (each generally designated by 24) mounted on parallel horizontal shafts 26, 28 which are rotatably mounted between parallel vertical plates 30, 32. Hardened dies 34 are mounted on each of the die holders 22 at evenly spaced intervals around the die holders. Likewise, spherical punches 36 are mounted on the punch carriers 24 at evenly spaced intervals around the punch carriers corresponding to the spacings between the dies 36 on the die holders 22. The die holders 22 and punch carriers 24 rotate in opposite directions so each punch 36 is intermittently aligned with one of the dies 34. Depending upon the adjustment of the apparatus 20 as explained below, the punches 36 are cooperable with the dies 34 to perforate sheet material S (FIG. 2) passing between the die holders 22 and the punch carriers 24.

Figure 2:
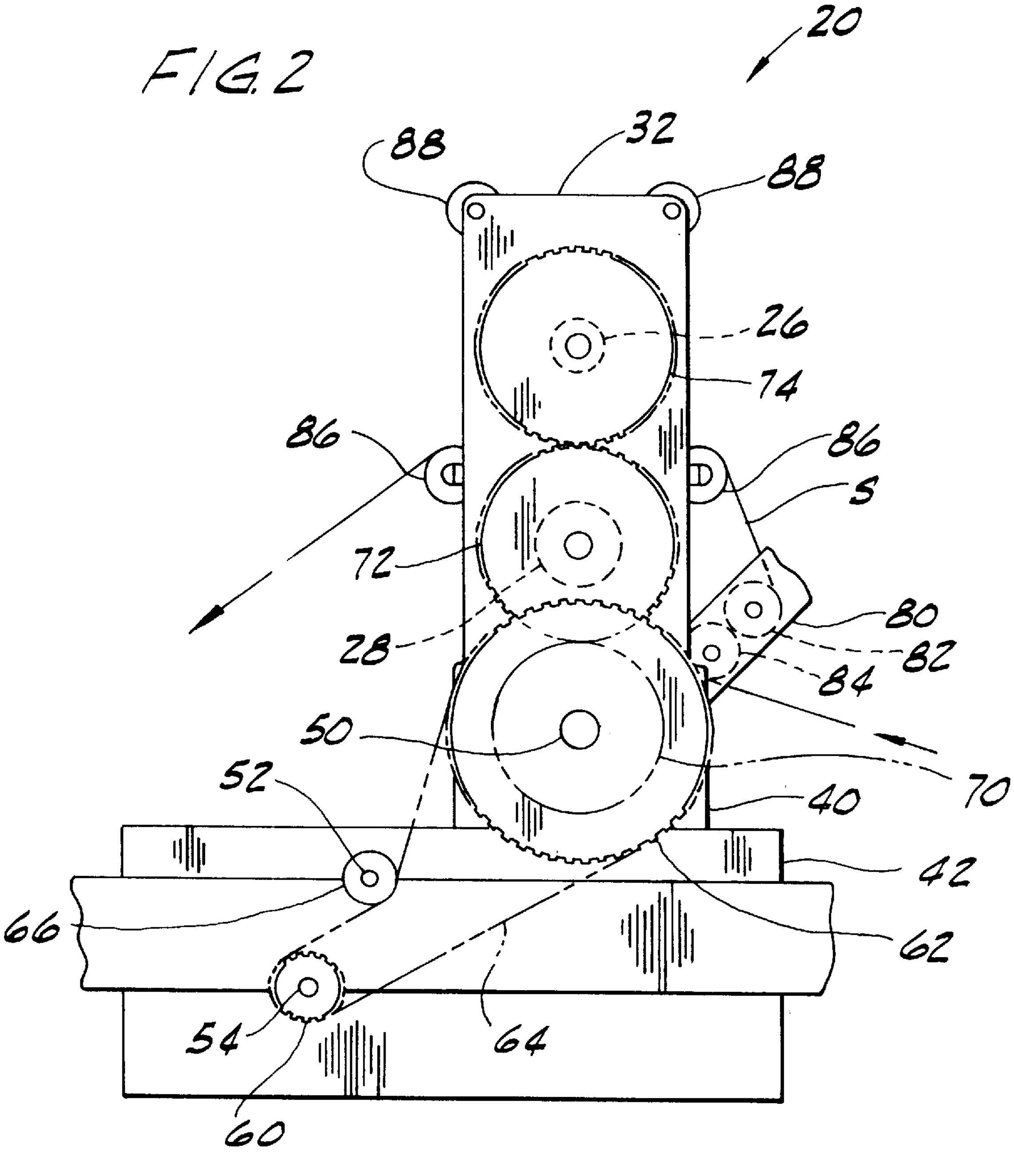
FIG. 2 is a right side elevation showing the drive mechanism.

As illustrated in FIG. 2, the plates 30, 32 are mounted on a base 40 atop a table 42. Together the plates 30, 32, base 40, and table 42 form a frame which may be part of a larger device such as a high speed machine for printing forms and labels. A shaft 50 extends through the base 40 and two more shafts 52, 54 extend through the table 42. Small and large toothed pulleys 60, 62 are mounted on shafts 54 and 50, respectively. A synchronous belt 64 having an interior toothed profile is trained around the toothed pulleys 60, 62 for transmitting power between shafts 54 and 50. Shaft 54 is driven by an electric motor (not shown). A tensioning pulley 66 mounted on shaft 52 engages the exterior of the belt 64 to ensure the belt does not slip on the toothed pulleys 60, 62. The position of shaft 52 is adjustable to appropriately tension the belt 64. A spur gear 70 (illustrated in FIG. 2 as a dashed circle) is mounted on shaft 50 so it turns as the belt 64 drives the large toothed pulley 62. Two more spur gears 72, 74 are mounted on the parallel shafts 28, 26, respectively, so the teeth of gear 70 engage the teeth of gear 72 and the teeth of gear 72 engage the teeth of gear 74. Thus, shafts 26, 28 are driven in opposite directions as the belt 64 drives gear 70. Together, the motor, pulleys, belt and gears form a drive mechanism. Other types of drive mechanisms are well known in the art, and are envisioned as being within the scope of the present invention.

Beams 80 extend obliquely upward from the in-feed side of each of the plates 30, 32. (Only one beam 80 is shown in FIG. 2.) Nip and pull rollers 82, 84 are rotatably mounted on the beams 80 and are driven by the drive mechanism to pull the sheet material S into the apparatus 20. Guide rollers 86 positioned on the in-feed and out-feed sides of the plates 30, 32 guide the sheet material S between the die holders 22 and punch carriers 24. Auxiliary guide rollers 88 on opposite upper corners of the plates 30, 32 guide the sheet material S to bypass the die holders 22 and punch carriers 24 when desired.

Figure 4:
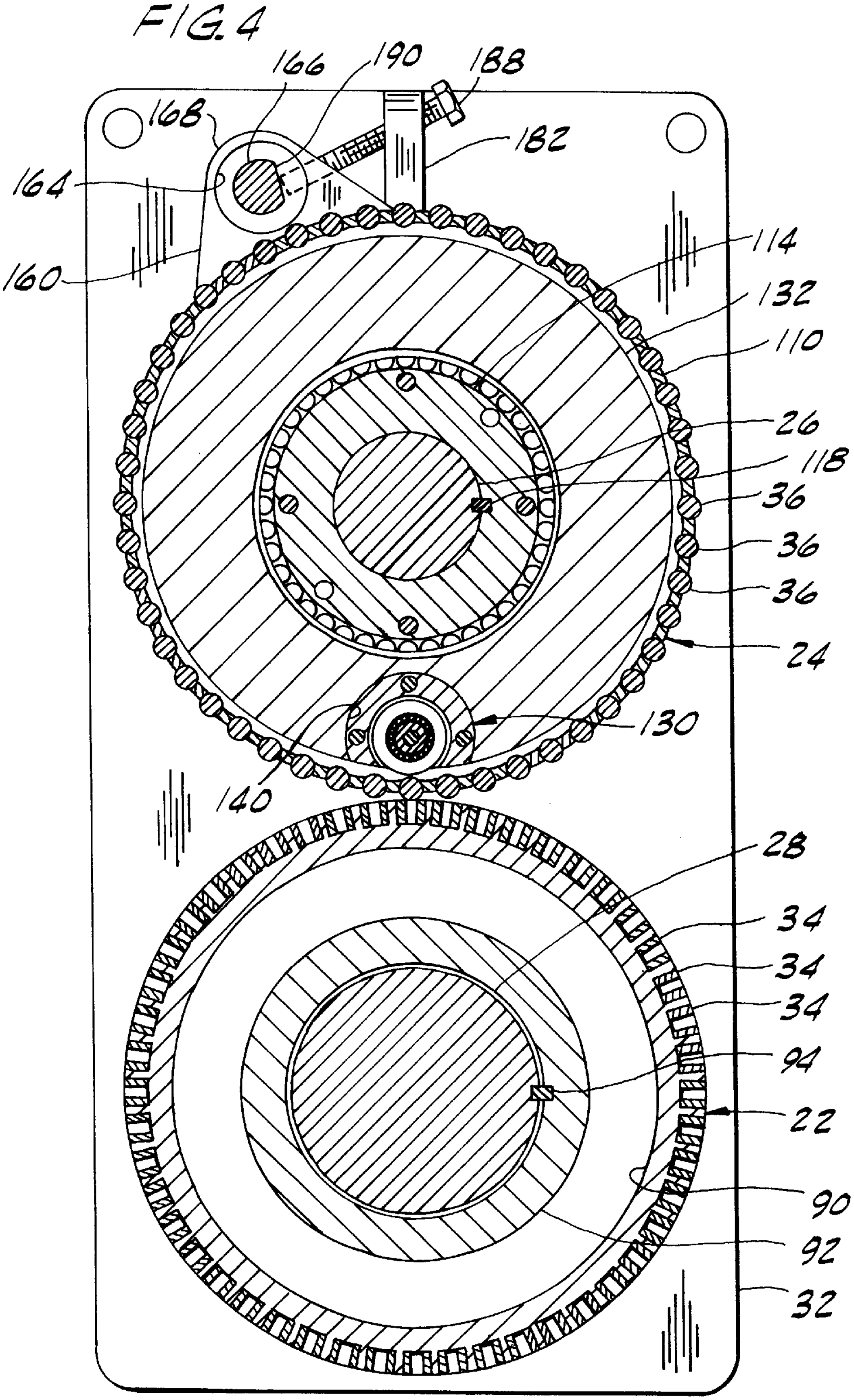
FIG. 4 is a cross section taken in the plane of line 4—4 of FIG. 1.
Figure 5:
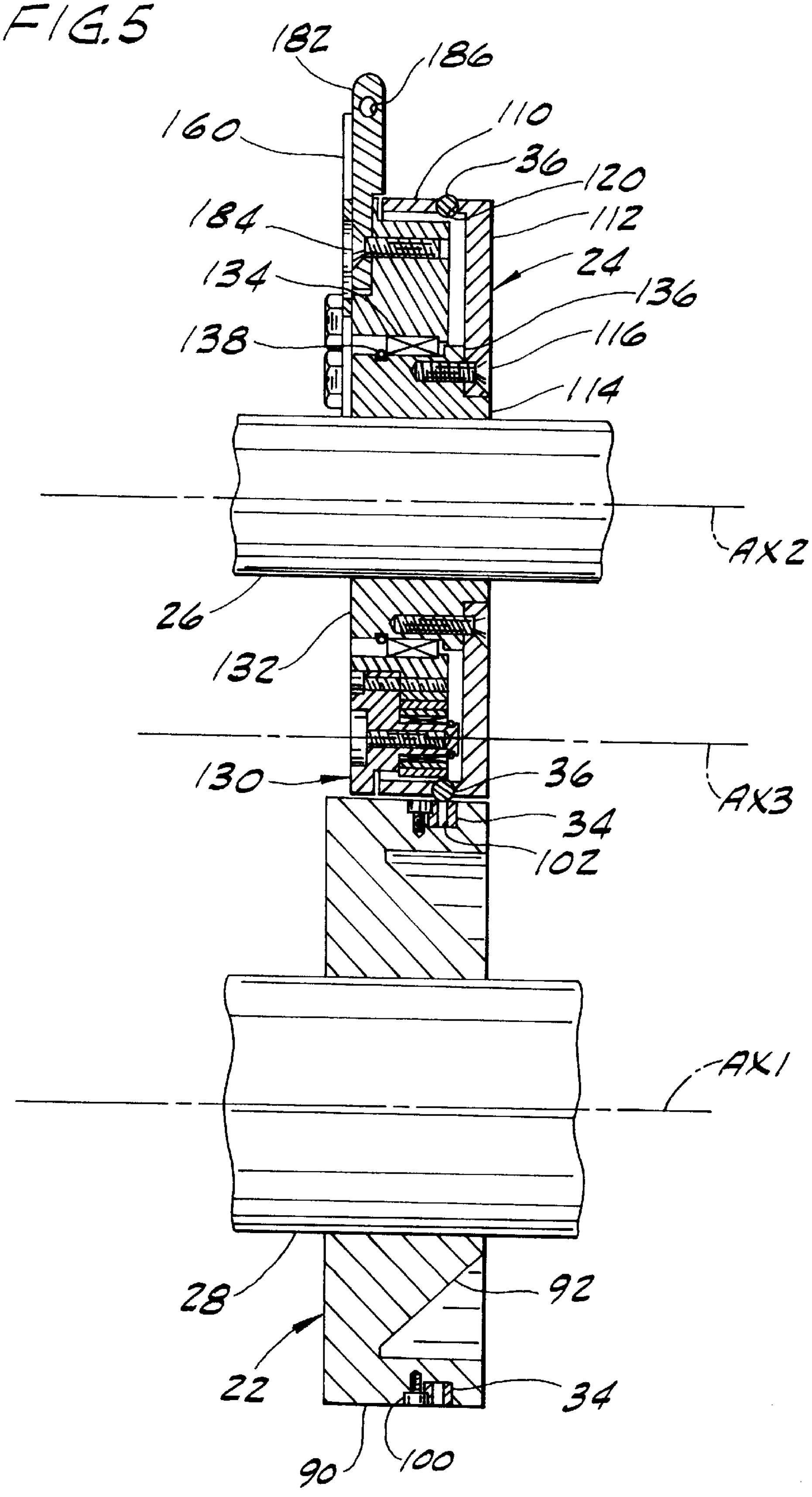
FIG. 5 is a cross section taken in the plane of line 5—5 of FIG. 3.
Figure 8:
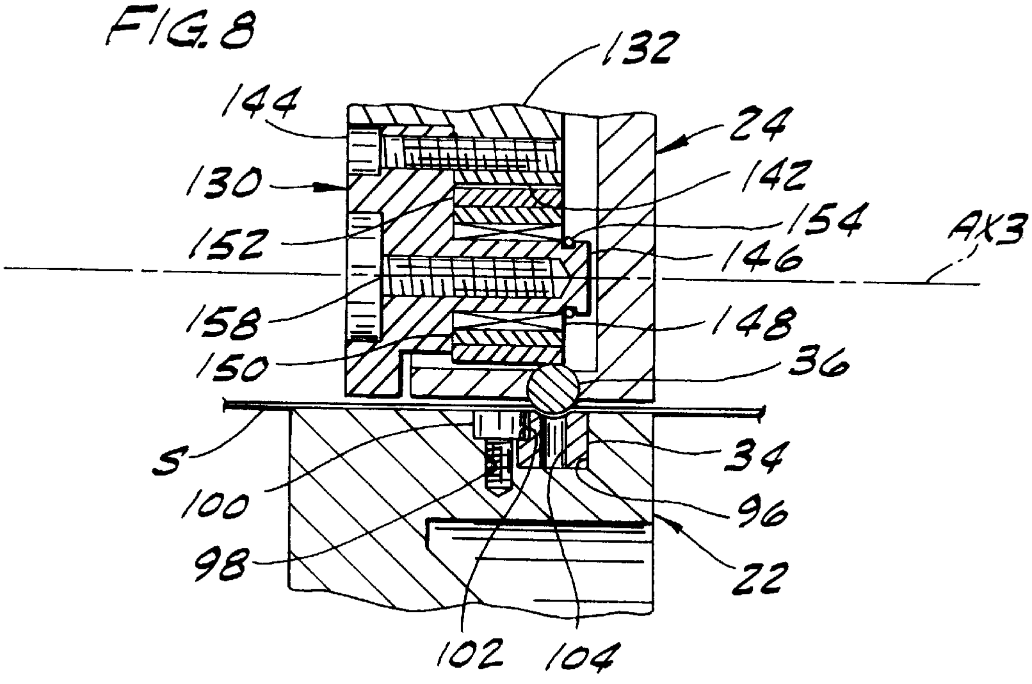
FIG. 8 is a cross section showing a detail of FIG. 5.

Turning to FIG. 5, each die holder 22 comprises a conical hub 92 secured to shaft 26 with a key 94 (FIG. 4) so the die holder 22 rotates with the shaft about a first axis AX1. The hub has an annular rim 90 generally concentric with axis AX1. As best illustrated in FIG. 8, radial bores 96 are equidistantly spaced around the rim circumference, and threaded, counter-bored holes 98 are axially positioned adjacent each bore. One die 34 is positioned in each bore 96 and held in place by a socket head cap screw 100 threaded into the adjacent hole 98 so the cap screw head is recessed below the outer surface of the rim 90. A segment of each die 34 is machined away to form a shoulder 102 engageable by the head of the screw 100 to hold the die in its bore 96. Each die 34 is tubular, having a cylindrical cavity 104 extending between circular openings at each end. Although other cavity diameters are within the scope of this invention, the cavity diameter of the preferred embodiment is approximately one half the diameter of the spherical punch 36.

As also shown in FIG. 5, each punch carrier 24 comprises an annular disk 112 fastened to a hub 114 with flat head screws 116, the hub being secured to shaft 28 with a key 118 (FIG. 4) so the punch carrier 24 rotates with the shaft about a second axis AX2 generally parallel to axis AX1. The disk has an annular rim 110 generally concentric with axis AX2. Radial apertures 120 extend through the rim 110 at equidistant intervals about its circumference for holding the punches 36. Although the apertures 120 are slightly larger than the diameter of the punches 36 so the punches are free to move radially within the apertures, the exterior end of each aperture is upset so its diameter is slightly smaller than the diameter of the punches. Therefore, the punches 36 cannot pass entirely through the exterior ends of the apertures 120.

Referring now to FIGS. 4 and 5, apparatus 20 further includes stop means comprising a stop, generally designated 130, and a stop support in the form of a ring 132 concentrically positioned inside the annular rim 110 of the punch carrier 24. The support ring has a diameter sufficiently large to prevent the punches 36 from passing entirely through the interior ends of the punch carrier apertures 120. Accordingly, the punches 36 are captured within the punch carrier apertures 120 but are free to move in a radial direction with respect to axis AX2 between an extended position in which they protrude from the apertures and a retracted position in which they are recessed within the apertures. As will be described later, the stop 130 on the support ring 132 engages each punch 36 during each revolution of the punch carrier to hold the punch in its extended position against inward radial movement. If the punch 36 and corresponding die 34 are appropriately positioned with respect to one another when the stop 130 engages the punch, the punch will cooperate with the die to perforate sheet material S passing between them.

As also illustrated in FIG. 5, a roller bearing 134 is positioned between the support ring 132 and hub 114 to permit the punch carrier to freely rotate relative to the ring. A radial flange 136 projecting from the inner diameter of the support ring 132 and a spiral retaining ring 138 combine to hold the roller bearing 134 in fixed axial position on shaft 26 between the support 132 and punch carrier hub 114. Thus, when the ring 132 is held in a fixed position with respect to the side plates 30, 32, the shaft 26 and punch carrier 24 are free to rotate with respect to the ring. As the punches 36 orbit the ring along a generally circular path, the stop 130 engages each punch once during each revolution of the punch carrier.

As shown in FIG. 4, the support ring 132 has an opening 140 adjacent its outer diameter for receiving the stop 130. Turning to FIG. 8, a flange 142 extends partially around the opening 140 for fastening the stop 130 to the support ring 132 with three cap screws 144. The stop 130 includes a central stud 146 on which a small roller bearing 148 is mounted. A sleeve 150 of DELRIN Polymer® or nylon polymer is fitted around the roller bearing 148 to dampen noise, and a hardened steel sleeve 152 surrounds the polymer sleeve to rigidly hold the punches 36 against inward radial movement when the sleeve 152 engages the punches. DELRIN® is a federally registered trademark of E.I. du Pont de Nemours & Company of Wilmington, Del. Sleeves 150, 152 are tightly fitted so they rotate with the outer race of the roller bearing 148. The roller bearing 148 and sleeves 150, 152 form a roller which rotates about an axis AX3 to permit the punches 36 to ride freely over the stop 130 as they pass. The roller is held in place on the stud 146 by a split retaining ring 154 seated in a groove around the stud. A set screw 158 screwed into the stud 146 may be removed to expose a lubrication passage (not shown) in the stud for lubricating the roller bearing 148.

Figure 3:
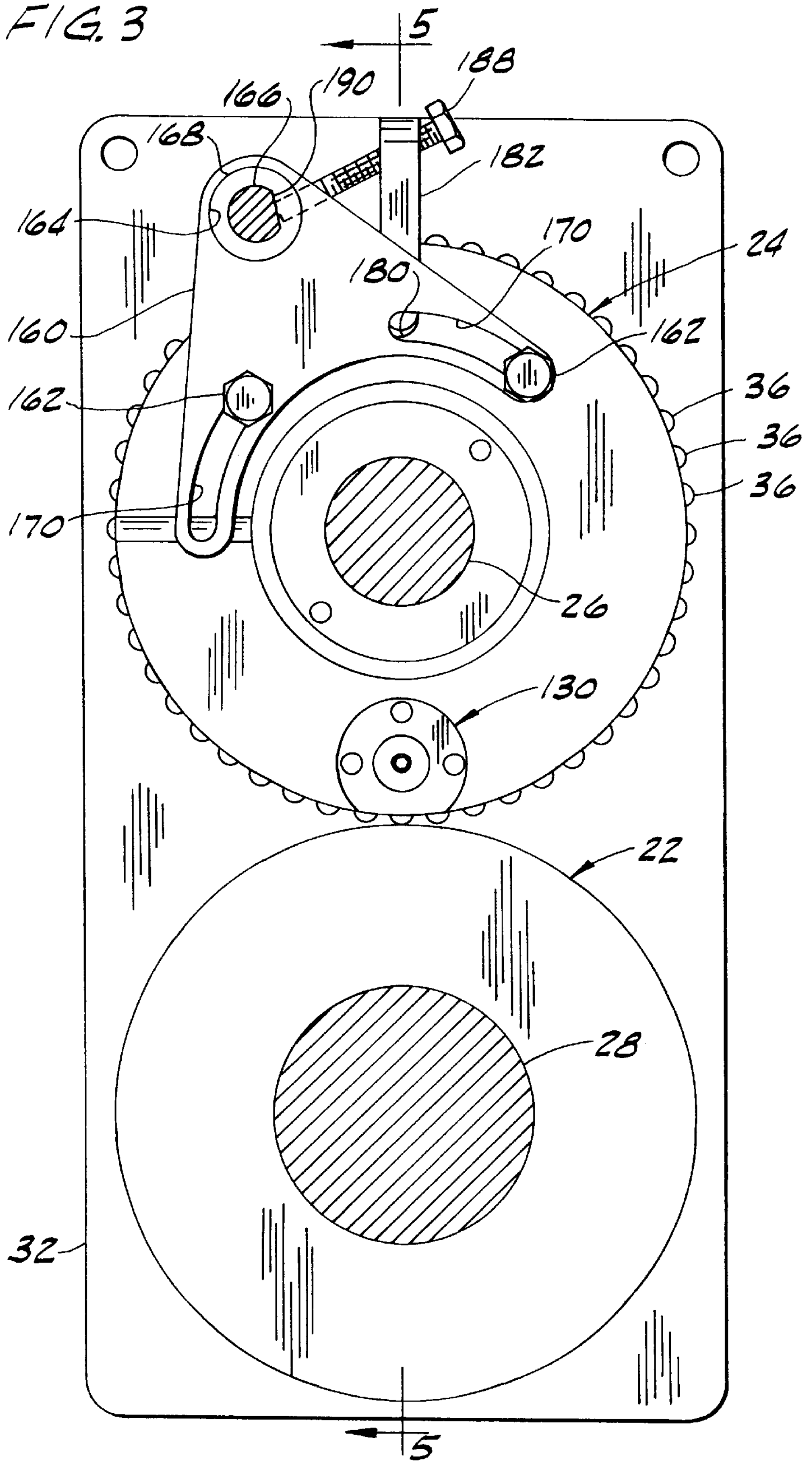
FIG. 3 is a cross section taken in the plane of line 3—3 of FIG. 1.
Figure 6:
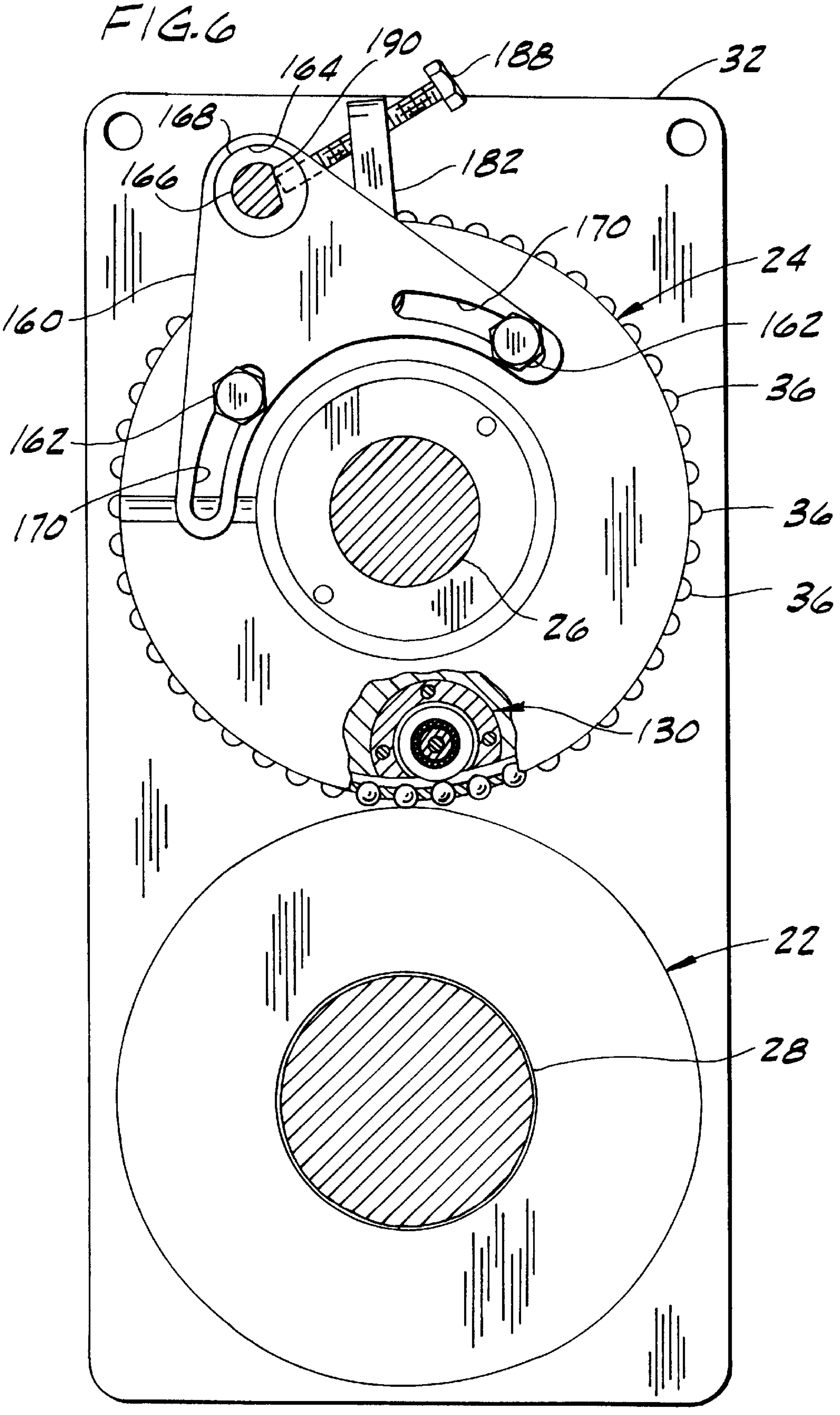
FIG. 6 is a cross section similar to that of FIG. 3 in further partial cross section showing the apparatus adjusted for non-perforation.

Turning to FIG. 3, a slotted plate 160 is fastened to the support ring 132 with two hex head fasteners 162. The plate 160 extends upward from the ring 132 and has a hole 164 therein for engaging a generally circular bar 166 extending between the plates 30, 32. An insert 168 made of synthetic material is positioned within the hole 164 and around the bar 166 for dampening vibration between the plate 160 and bar. Arcuate slots 170 in the plate 160 permit the support ring to be adjustably rotated relative to the plate, as will be evident from a comparison of FIG. 3 and FIG. 6. The fasteners 162 may be tightened to prevent movement between the support ring 132 and plate 160 once the desired position is achieved. Together the plate 160, fasteners 162 and bar 166 form means for locking the support ring 132 in a fixed position relative to the frame.

As further illustrated in FIGS. 3 and 5, a radial groove 180 is formed in the support ring 132 for accepting an arm 182 which is fastened to the support by means of a flat head screw 184. The arm 182 includes a threaded hole 186 (FIG. 5) into which a hex head adjustment bolt 188 is threaded. The bolt 188 engages a flat land 190 on the generally circular bar 166 for adjusting the angular position of the support ring 132 and stop 130 relative to the frame when the fasteners 162 are loose. Turning the adjustment bolt 188 in one direction causes the ring 132 to rotate clockwise; turning it in the opposite direction causes the ring to rotate counter-clockwise. As the ring 132 is rotated, the stop 130 moves relative to the frame.

To use the apparatus 20 of the present invention, sheet material S (e.g., a continuous web of sheet material) is threaded through the nip and pull rollers 82, 84, over the guide rollers 86 and between the punch carriers 24 and die holders 22 as shown in FIG. 2. The drive mechanism is engaged to rotate the punch carriers 24 and die holders 22 in opposite directions and to rotate the nip and pull rollers 82, 84. As rollers 82, 84 rotate, they feed the sheet material S generally to the left as shown in FIG. 2 and between the punch carriers 24 and die holders 22 so the sheet material travels at a speed equal to the linear speed of the exteriors of the punch carriers and die holders. As a result, the apparatus 20 does not induce significant in-plane tensioning of the sheet material S.

Figure 7:
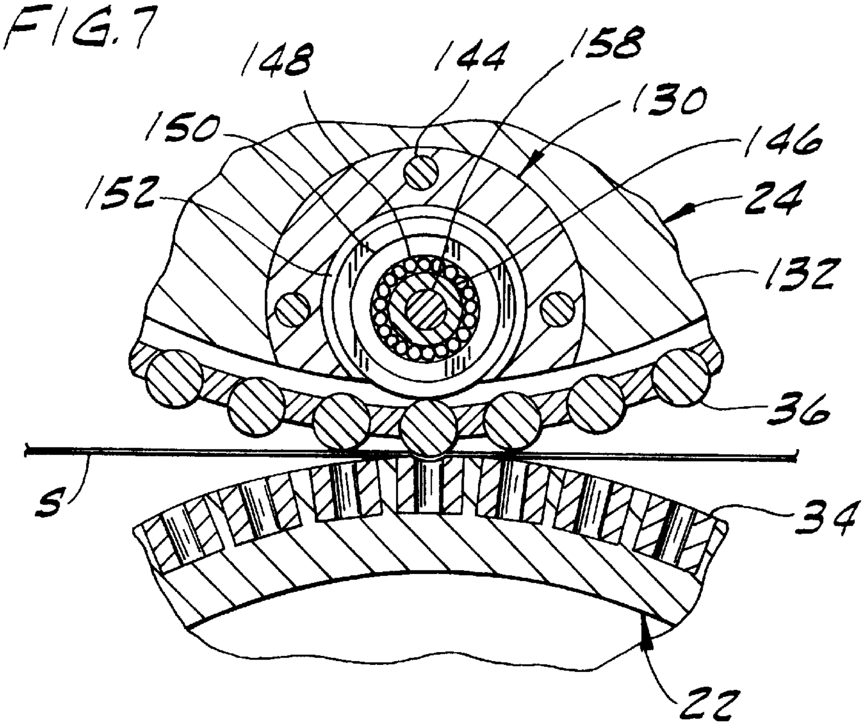
FIG. 7 is a cross section showing a detail of FIG. 4.

As each punch carrier 24 rotates, it carries its punches 36 around a respective stationary support ring 132 and past the stop 130 on the ring (FIGS. 7 and 8). As the punches 36 orbit the support ring 132, centrifugal force pushes them outward in apertures 120 toward their extended positions, but they are free to move inward within the apertures toward their retracted positions if they encounter an obstruction. However, when a punch 36 is aligned with the stop 130, the sleeve 152 of the stop holds the punch in its extended position and prevents it from moving inward in the aperture 120 toward its retracted position. The gears 72, 74 synchronize the punch carriers 24 and die holders 22 so each punch 36 directly aligns with one of the dies 34 during each revolution. When the position of the support ring 132 is adjusted as shown in FIG. 7 so the stop 130 engages the punch 36 when it is aligned with the corresponding die 34, the punch cooperates with the die to perforate the sheet material S.

Figure 9:
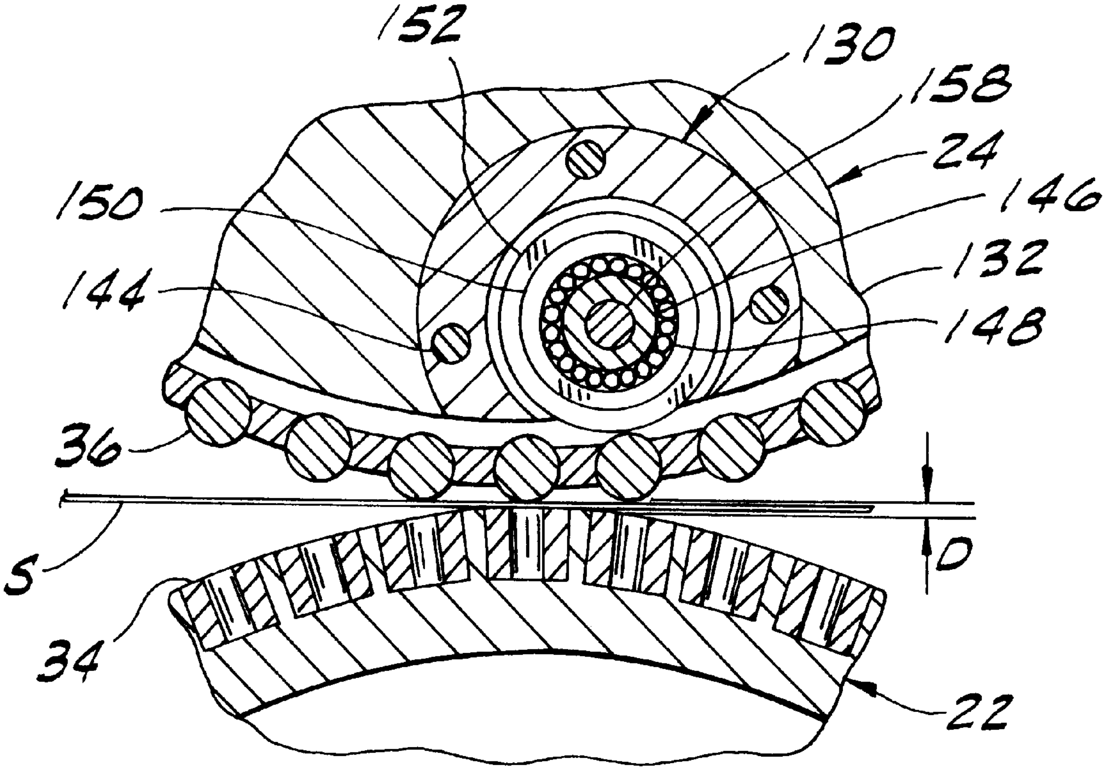
FIG. 9 is a cross section showing a detail of FIG. 6.

As previously described, the angular (rotational) position of the support ring 132 is adjustable by loosening the fasteners 162, turning the adjustment bolt 188 to rotate the ring until the stop 130 is in the desired position of adjustment, and re-tightening the fasteners 162. For example, the support ring 132 may be adjusted so the stop 130 is in a non-perforating position as shown in FIG. 9. In this position, the stop 130 engages the punch 36 when the punch is sufficiently out of alignment with the corresponding die 34 that the punch and die do not cooperate to perforate the sheet material S. The apparatus 20 may also be adjusted to any position between the positions shown in FIGS. 7 and 9 to change the location of the punch 36 relative to the frame when the stop 130 engages the punch. By changing this location, the amount each punch 36 penetrates the corresponding die 34 when held by the stop 130 is adjusted. It will be apparent that in some of these positions, the punches 36 cooperate with the corresponding dies 34 to perforate the sheet material S when the punches are not directly aligned with the die.

By adjusting the angular position of the support ring 132 and stop 130 relative to the frame, the distance D (FIG. 9) between a punch 36 and the edge of the corresponding die cavity opening when the stop engages the punch may be varied. Depending upon the type and thickness of sheet material S passing through the apparatus 20, differing distances D are desirable. For instance, the distance D may be reduced until the punch interferes with the edge of the die cavity opening to perforate some materials which are particularly difficult to cut. Other softer materials may be cut efficiently with considerably larger distances D. The spherical shape of the punch 36 forces the sheet material locally downward into the die cavity and pulls the material inward toward the center of the die opening. Thus, with many materials, the sheet material is sheared along the edge of the die cavity opening even when the distance between the punch and edge is greater than zero. In order to minimize die wear and the other problems associated with contact between punches 36 and dies 34, it is desirable to adjust the portions of the ring 132 and stop 130 relative to the frame to provide the largest distance which will reliably perforate the material.

The spherical punch shape also has an advantage when laminated sheet materials are perforated because the punch tends to squeeze the adhesive between the layers away from the area which is being perforated. Thus, the adhesive is displaced from the areas of the sheet material which come in contact with the punches 36 and dies 34. As adhesives tend to gum up the punches and dies, displacing them reduces this tendency. Although the spherical punches can indent the sheet material surrounding the perforations, out-feed nip and pull rollers (not shown) can be used to flatten the material if desired.

On occasion, sheet materials S will break. Unlike rotary punches which use cylindrical pin punches, the sheet material S will not wrap around the punch carrier of the present invention if it should break because the spherical punches will not grab the material and drag it around the carrier. Thus, significant down time and potential damage is avoided by the preferred embodiment of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotary perforation apparatus for perforating sheet material, said apparatus comprising:

a frame;

a die holder mounted on said frame for rotation about a first axis;

at least one die mounted on the die holder, a punch carrier mounted on the frame for rotation about a second axis generally parallel to said first axis;

at least one punch mounted on the punch carrier movable in a generally radial direction with respect to said second axis, the punch tracing a generally circular path as the punch carrier rotates;

a drive mechanism for rotating at least one of the die holder and the punch carrier about its respective axis to effect relative rotation between the die holder and the punch carrier, said rotation being synchronized so that the punch on the punch carrier is intermittently cooperable with the die on the die holder for perforating sheet material fed between the die holder and the punch carrier; and stop means mounted on the frame and intermittently engageable with the punch at a selected location along said path as the drive mechanism effects relative rotation between the die holder and the punch carrier, said stop means being engageable with the punch to hold the punch against inward radial movement toward said second axis when the punch is cooperating with the die to perforate said sheet material, said stop means disengaging the punch during at least a portion of each revolution of the punch carrier to permit the punch to move radially inward toward said second axis when the punch is out of registration with the die, and wherein said stop means is adjustable relative to the frame to vary said selected location along said path at which the stop means engages the punch.

2. Apparatus as set forth in claim 1 wherein said selected location is one where the punch and die are sufficiently close to one another to perforate said sheet material.

3. Apparatus as set forth in claim 1 wherein said selected location is one where the punch and die are separated too far apart to perforate said sheet material.

4. Apparatus as set forth in claim 1 wherein the punch is spherical.

5. Apparatus as set forth in claim 4 wherein the die has a circular cavity with which the punch cooperates to perforate said sheet material, the cavity having a diameter which is approximately half a diameter of the spherical punch.

6. Apparatus as set forth in claim 1 wherein the punch carrier has an annular rim concentric with said second axis and at least one aperture for receiving the punch, and wherein said stop means is disposed inside the annular rim of the punch carrier.

7. Apparatus as set forth in claim 6 wherein the punch carrier includes a hub and a disk connecting the annular rim to the hub, and wherein the hub is rotatable with respect to said stop means support to permit the punch carrier to freely rotate relative to the support.

8. Apparatus as set forth in claim 6 wherein said stop means comprises a support mounted inside the punch carrier, a stop mounted on the support for engagement with the punch, the support being rotatable on said second axis to adjust an angular position of the stop mounted on the support relative to the frame, and means for locking the support in fixed position relative to the frame to maintain a selected position of angular adjustment.

9. Apparatus as set forth in claim 8 wherein said stop mounted on the support comprises a roller mounted on the support for rotation about a third axis, said third axis being non-coincident with said first and second axes and generally parallel thereto.

10. Apparatus as set forth in claim 9 wherein said stop means support has a generally round exterior surface concentrically positioned with respect to the rim of the punch carrier and disposed closely adjacent the rim for retaining the punch within the aperture in the punch carrier.

11. A rotary perforation apparatus for perforating sheet material, said apparatus comprising:

a frame;

first and second generally parallel shafts rotatably mounted on the frame;

a die holder mounted on said first shaft for rotation with respect to the frame;

at least one die mounted on the holder, the die having a cavity extending from an opening generally radially inwardly toward said first shaft;

a punch carrier mounted on said second shaft for rotation with respect to the frame, the punch carrier comprising an annular rim having at least one aperture extending radially inwardly from an exterior surface of the rim to an interior surface of the rim;

a punch positioned within the punch carrier aperture for generally radial, reciprocal movement within the aperture;

a drive mechanism for rotating the die holder and punch carrier in synchronized motion with respect to each other so that the punch is intermittently cooperable with the die opening for perforating sheet material passing between the die holder and punch carrier; and a stop positioned inside the interior surface of the rim of the punch carrier for intermittently engaging the punch as the drive mechanism rotates the die holder and the punch carrier, said stop being engageable with the punch at a preselected location to hold the punch against inward radial movement toward said second shaft when the punch is cooperating with the die opening to perforate said sheet material, said stop disengaging the punch during at least a portion of each revolution of the punch carrier to permit the punch to move radially inward toward said second shaft when the punch is out of registration with the die opening, and wherein the stop is moveable with respect to the frame to vary the location at which the stop engages the punch.

12. Apparatus as set forth in claim 11 wherein the punch carrier has a plurality of apertures extending radially inwardly from the exterior surface of said rim to the interior surface of said rim, said apparatus further comprising:

a plurality of dies mounted on the holder, each of said plurality of dies having a cavity extending from an opening generally radially inwardly toward the first shaft; and a plurality of punches, each of said plurality of punches being positioned within one of said plurality of punch carrier apertures for generally radial, reciprocal movement relative to said second shaft.

13. Apparatus as set forth in claim 11 wherein the aperture in the rim of the punch carrier has a smaller width at said exterior surface of the rim than at the interior surface of the rim thereby to retain the punch within the punch carrier aperture.

14. A rotary perforation apparatus for perforating sheet material, said apparatus comprising:

a frame;

a die holder mounted on said frame for rotation about a first axis;

at least one die mounted on the die holder;

a punch carrier mounted on the frame for rotation about a second axis generally parallel to said first axis;

at least one punch mounted on the punch carrier movable in a generally radial direction with respect to said second axis;

a drive mechanism for rotating at least one of the die holder and the punch carrier about its respective axis to effect relative rotation between the die holder and the punch carrier, said rotation being synchronized so that the punch on the punch carrier is intermittently cooperable with the die on the die holder for perforating sheet material fed between the die holder and the punch carrier; and a stop mounted on the frame and intermittently engageable with the punch as the drive mechanism effects relative rotation between the die holder and the punch carrier, the stop being engageable with the punch at a preselected location to hold the punch against inward radial movement toward said second axis when the punch is cooperating with the die to perforate said sheet material, the stop disengaging the punch during at least a portion of each revolution of the punch carrier to permit the punch to move radially inward toward said second axis when the punch is out of registration with the die, and wherein the stop is moveable with respect to the frame to vary the location at which the stop engages the punch.

* * * * *